United States Patent
Sebralla et al.

(10) Patent No.: US 9,511,392 B2
(45) Date of Patent: Dec. 6, 2016

(54) METHOD FOR COATING METAL SURFACES IN A MULTI-STEP METHOD

(75) Inventors: Lars Sebralla, Bruchköbel (DE); Manfred Walter, Hanau (DE)

(73) Assignee: Chemetall GmbH (DE)

( * ) Notice: Subject to any disclaimer, the term of this patent is extended or adjusted under 35 U.S.C. 154(b) by 0 days.

(21) Appl. No.: 13/203,750

(22) PCT Filed: Mar. 3, 2010

(86) PCT No.: PCT/EP2010/052687
§ 371 (c)(1),
(2), (4) Date: Nov. 21, 2011

(87) PCT Pub. No.: WO2010/100187
PCT Pub. Date: Sep. 10, 2010

(65) Prior Publication Data
US 2012/0070674 A1  Mar. 22, 2012

(30) Foreign Application Priority Data

Mar. 6, 2009  (DE) .................. 10 2009 001 372

(51) Int. Cl.
| | | |
|---|---|---|
| *C23C 22/83* | (2006.01) | |
| *B05D 7/00* | (2006.01) | |
| *C23C 22/78* | (2006.01) | |
| *C23C 22/76* | (2006.01) | |
| *C23C 22/07* | (2006.01) | |
| *C23C 22/08* | (2006.01) | |
| *C23C 22/34* | (2006.01) | |
| *C23C 22/56* | (2006.01) | |
| *C23C 22/66* | (2006.01) | |

(52) U.S. Cl.
CPC ............. *B05D 7/54* (2013.01); *B05D 7/544* (2013.01); *B05D 7/546* (2013.01); *C23C 22/07* (2013.01); *C23C 22/08* (2013.01); *C23C 22/34* (2013.01); *C23C 22/56* (2013.01); *C23C 22/66* (2013.01); *C23C 22/76* (2013.01); *C23C 22/78* (2013.01); *C23C 22/83* (2013.01); *B05D 7/51* (2013.01); *B05D 2202/25* (2013.01); *B05D 2350/60* (2013.01); *B05D 2518/10* (2013.01); *C23C 2222/20* (2013.01); *Y02T 50/67* (2013.01); *Y10T 428/31663* (2015.04)

(58) Field of Classification Search
None
See application file for complete search history.

(56) References Cited

U.S. PATENT DOCUMENTS

| | | |
|---|---|---|
| 6,132,808 A | 10/2000 | Brown et al. |
| 6,436,475 B1 | 8/2002 | Adler et al. |
| 6,488,990 B1 | 12/2002 | Wetteren et al. |
| 6,596,835 B1 | 7/2003 | Brown et al. |
| 7,615,257 B2 * | 11/2009 | Jung et al. ................ 427/508 |
| 7,935,274 B2 | 5/2011 | Schlosser |
| 8,182,874 B2 | 5/2012 | Kolberg et al. |
| 8,585,834 B2 | 11/2013 | Rodzewich et al. |
| 2004/0094235 A1 | 5/2004 | Rodzewich et al. |
| 2006/0151070 A1 | 7/2006 | Rodzewich et al. |
| 2006/0214137 A1 | 9/2006 | Schlosser |
| 2008/0127859 A1 | 6/2008 | Kolberg et al. |
| 2010/0176000 A1 | 7/2010 | Inbe et al. |

FOREIGN PATENT DOCUMENTS

| | | |
|---|---|---|
| DE | 10 2005 01 5573 A1 | 10/2006 |
| DE | 10 2005 015576 A1 | 10/2006 |
| EP | 1 206 977 A2 | 5/2002 |
| EP | 1206977 A2 | 5/2002 |
| EP | 2 067 882 A1 | 6/2009 |
| EP | 2067882 A1 | 6/2009 |
| WO | 00/46310 A1 | 8/2000 |
| WO | 2006/050915 A2 | 5/2006 |
| WO | 2006/050917 A2 | 5/2006 |
| WO | 2008029926 A1 | 3/2008 |
| WO | WO 2008/029926 A1 | 3/2008 |

OTHER PUBLICATIONS

Sheffer, et al. "Anion embedded sol-gel films on Al for corrosion protection", J. Corrosion Sci., 46 (2004), pp. 2975-2985.

* cited by examiner

*Primary Examiner* — William Phillip Fletcher, III
(74) *Attorney, Agent, or Firm* — Jeremy J. Kliebert

(57) ABSTRACT

A method for coating metal surfaces, in particular surfaces of wheels made of an aluminum alloy, in a multi-step method, wherein the metallic surfaces are first contacted with an aqueous composition predominantly containing silane/silanol/siloxane/polysiloxane and thereafter contacted with an aqueous composition predominantly containing at least one phosphonic compound.

27 Claims, No Drawings

METHOD FOR COATING METAL SURFACES IN A MULTI-STEP METHOD

RELATED APPLICATIONS

This application is a §371 application of PCT/EP2010/052687 filed Mar. 3, 2010, and claims priority from German Patent Application No. 10 2009 001 372.5 filed Mar. 6, 2009.

The invention relates to a process for coating metallic surfaces, in particular surfaces of wheels made from an aluminium alloy, in a multi-stage process, in which the metallic surfaces are brought into contact with two different aqueous conversion compositions, and to the use of the process according to the invention prior to painting or gluing.

The corrosion-protective coating of wheels made from an aluminium alloy is typically carried out today worldwide with an aqueous solution based on titanium or/and zirconium fluoride or with an aqueous solution based on phosphonate-containing compounds or with a combination of both solutions in a two-stage coating process, before the wheels are coated with paint. The wheels can optionally be manufactured with multiple parts and possibly also from various materials, not only from various aluminium materials. The person skilled in the art refers only to wheels, whereas lay people often refer to wheel rims. Furthermore, all other types of aluminium components can also be coated according to the invention, in particular decorative trims, various other attachments, profiles and housings.

With aluminium and aluminium alloy surfaces in particular there is a need to further improve the corrosion protection, above all because of the filiform corrosion that still occurs despite high-quality conversion coating(s). Filiform corrosion typically occurs in the form of filigree threads e.g. on edges of diamond-turned surfaces (=subareas of surfaces that have already been conversion-coated and painted are machined) and following minor damage to the painted surfaces from stone chips or curb damage. This is because the conversion-coating compositions used today around the world in the production of aluminium alloy wheels are nevertheless not sufficient to adequately restrict filiform corrosion.

Even a multi-stage process variant, in which the aluminium surfaces are treated first with titanium and/or zirconium complex fluoride and then with at least one phosphonate, is not sufficient to meet expectations in the industry.

The hitherto most commonly used processes for the treatment of metallic surfaces or the pretreatment of metallic surfaces prior to painting are in many cases based on the use of chromium(III) and chromium(VI) compounds, optionally together with various additives. Parts, coil, coil sections or components such as for example wheels are preferably coated as metallic articles whose surfaces are to be treated.

Because of the toxicological and ecological risks associated in particular with chromium-containing or nickel-containing processes, alternatives to these processes have been sought for many years in all areas of surface technology for metallic substrates, but it has repeatedly been found nevertheless that, in many applications, completely chromate-free processes do not meet 100% of the performance spectrum, or not with the desired reliability. Furthermore, the requirements of the automotive industry have continued to rise. It is therefore difficult to produce a better corrosion protection with at least one conversion coating than that already achieved to date. The next step is to try to keep the chromate contents as low as possible and to replace $Cr^{6+}$ with $Cr^{3+}$ as far as possible.

The use of for example silanes/silanols in aqueous compositions to produce siloxane-rich/polysiloxane-rich corrosion-protective coatings prior to painting is known in principle. For the sake of simplicity, silane/silanol/siloxane/polysiloxane are often referred to below simply as silane. Likewise, aluminium and aluminium alloy surfaces are often referred to below simply as aluminium.

These silane-based coatings have proved themselves. However, in some cases the processes for coating with an aqueous composition containing predominantly silane as the solid or/and active ingredient and optionally also organic solvent are difficult to use. The coatings formed do not always have excellent properties. There can moreover be problems with adequately detecting or/and characterising the very thin and preferably transparent silane coatings on the metallic substrate and any defects with the naked eye or with optical aids. The corrosion protection and paint adhesion of the siloxane-rich or/and polysiloxane-rich coatings formed are often but not always good, and in some cases not sufficiently good for certain applications, even when applied in the appropriate way. There is a need for further processes using at least one silane which offer good process reliability and high quality of the coatings produced, in particular in terms of corrosion resistance and paint adhesion.

In the formulation of silane-containing aqueous compositions it has moreover proved effective to add a small or large amount of at least one component selected from the group of organic monomers, oligomers and polymers. In such compositions the type and amount of the silane addition is in some cases critically important to their success. Usually, however, the amounts of silane added are comparatively small, mostly only up to 5 wt. % of all solids contents, and they act as a coupling agent for the predominantly organic composition, wherein the coupling effect should prevail in particular between the metallic substrate and the paint and optionally between the pigment and the organic paint constituents, but to a lesser extent a slight cross-linking action can also occur in some cases. Predominantly, very small amounts of silane are added to heat-curable resin systems or silylated organic oligomers and polymers are used.

The object was therefore to propose aqueous compositions which are based on an environmentally friendly chemical composition and guarantee a high corrosion resistance. Such compositions are preferably also suitable for multi-metal applications, in which for example steel and zinc-rich metallic surfaces and optionally also aluminium-rich metallic surfaces are treated or pretreated in the same bath. The object was also to propose aqueous compositions which are suitable for coating surfaces of wheels made from an aluminium alloy and which are so outstanding that filiform corrosion can be at least markedly reduced.

The object is achieved by a process for coating metallic surfaces, in particular surfaces of wheels made from an aluminium alloy, in a multi-stage process, characterised in that the metallic surfaces are first brought into contact with an aqueous composition containing a substantial content of silane/silanol/siloxane/polysiloxane and then with an aqueous composition predominantly containing at least one phosphone compound, at least 80% of all phosphone compounds of this composition being selected from compounds of the type XYZ, wherein Y is mutually independently an unbranched alkyl group having 8 to 16 C atoms or an alkyl group having 8 to 16 C atoms, of which as a statistical mean up to 20% of the C atoms of the alkyl chains exhibit a functional group, wherein X is an OH, $NH_2$, NHR', $CH=CH_2$, CONHOH, COOR', acrylic acid amide, epoxy, $CH_2=CR''—COO$, COOH, $HSO_4$, $(OH)_2PO$, $(OH)_2PO_2$, $(OH)(OR')PO$, $(OH)(OR')PO_2$ or $Si(OH)_3$ group, wherein Z is an $(OH)_2PO$, $(OH)_2PO_2$, $(OH)(OR')PO$ or $(OH)(OR')PO_2$ group, wherein R' is an alkyl group having 1 to 4 C atoms, wherein R" is an H atom or an alkyl group having 1 to 4 C atoms, wherein groups X and Z are each bound to group Y in its terminal position and wherein first a silane coating and then a phosphonate coating are formed in succession before the metallic surfaces are coated with at least one coat of paint or/and with at least one coat of adhesive.

The term "predominantly" means that the cited substance groups are the main constituents of these conversion compositions, disregarding water and optionally organic solvents. The silane composition preferably contains silanes/silanols/siloxanes/polysiloxanes as the predominant constituent in the aqueous solution.

Surfaces of in particular aluminium, aluminium alloys or/and aluminium-rich alloys with aluminium as the second most common constituent can be protected particularly successfully from corrosion with the process according to the invention. However, metallic surfaces based in particular on magnesium or titanium, such as magnesium alloys, titanium and titanium alloys, can also often be coated with a very high quality by the process according to the invention.

The at least one phosphone compound can in particular be at least one phosphonic acid or/and derivative(s) thereof, such as for example at least one salt or/and at least one ester, particularly preferably in each case at least one diphosphonic acid or/and derivative(s) thereof, such as for example at least one salt or/and at least one ester. The at least one phosphone compound is preferably capable of forming a largely to completely closed corrosion-resistant coat of approximately one monolayer, in particular with self-assembling molecules.

It has now also been found that a combination of silane coating and phosphonate coating can produce conversion coatings of a quality that in some cases has probably hitherto been unknown. It is even possible now to reduce filiform corrosion in aluminium and aluminium alloys, which hitherto could only be restricted with great difficulty, to a minimum. In wheel sections made from the aluminium alloy AlSi7, according to experiments by Daimler AG in relation to filiform corrosion, an average subsurface migration of just 0.9 mm was achieved for the first time with this coating sequence (example 25), whereas a chromium(VI) coating for comparative purposes resulted in an average subsurface migration of 2.4 mm (comparative example 28), i.e. much poorer values. The maximum thread length of the filiform corrosion in example 25 was just 4.0 mm, as compared with 7.0 mm in comparative example 28 with the chromium(VI) coating. Otherwise a chromium(VI) coating is still considered to be the best corrosion protection available today. A special test developed by Daimler AG was used for this purpose, which is much more accurate at assessing filiform corrosion than the previously existing filiform tests.

It has furthermore now been found that in many embodiments of the coating of the metallic surfaces in the multi-stage process according to the invention it is particularly advantageous if the initially applied silane coating does not dry significantly and does not dry out completely, but is in a wet, semi-wet or only partially dried state without strong condensation or strong polymerisation of the silanes when the phosphonate coating is applied.

It has now also been found that the performance of coatings in which a phosphonate coating is applied first, followed by a silane coating, is significantly poorer than that of coatings produced by the process variant according to the invention. It is therefore assumed that the phosphonate coating forms a significantly better-closed and hence better corrosion-protective layer than the silane coating.

It has been found that the addition of at least one complex fluoride based on titanium, hafnium or/and zirconium (including acids thereof and salts and esters thereof) to the silane-containing aqueous composition helps to minimise or prevent adverse effects on the binding of silane to the metallic surface, so that rinsing can have little or no adverse effect. An addition of at least one complex fluoride or/and at least one compound based on titanium, hafnium or/and zirconium conventionally helps to reduce or even prevent the washing away of the silane coating when rinsed with water, since many silane coatings are partially washed away when rinsed with water. The possibility is also optionally provided for the phosphonates of the phosphonate coating additionally to become somewhat integrated into the silane coating and not only to bind externally to the silane coating.

It has also been found that a combination of at least two complex fluorides, based in particular on fluorotitanic acid and fluorozirconic acid, allows an exceptional rise in the quality of the coating.

The combination of two conversion-coating compositions, one based on silane and the other on phosphonate, is not obvious, as these are very different groups of substances which cannot readily be combined successfully as successive coatings. This is because the properties and behaviour of silanes and phosphonates are very different. The time spent working on this application amounted to well over one man-year.

The term "silane" is used here for silanes, silanols, siloxanes, polysiloxanes and reaction products or derivatives thereof (=silanes/silanols/siloxanes/polysiloxanes), preferably for silanes, silanols, siloxanes and reaction products or derivatives thereof (=silanes/silanols/siloxanes), which are often also "silane" mixtures. The stated contents are preferably based on silane and not on silanol, siloxane or/and polysiloxane. Polysiloxanes are also included here, as these can form in particular if for example alkoxysilanes are used. For the addition of "silane", silanes/silanols/siloxanes are conventionally added in aqueous solution and can then react further in the aqueous solution to form silanols/siloxanes/polysiloxanes. The term "silanes/silanols/siloxanes" can be used throughout as an alternative to "silanes/silanols/siloxanes/polysiloxanes". The term "condensation" within the meaning of this application denotes all forms of crosslinking, further crosslinking and further chemical reactions of silanes/silanols/siloxanes/polysiloxanes or silanes/silanols/siloxanes. Silanes are often used in the form of monomers or/and precondensates in the form of oligomers or/and polymers as substances for addition to a composition according to the invention; in the aqueous composition oligomers or/and polymers usually form within a few hours or a few days, despite the addition for example of silane monomers only. The dry coating produced therefrom often contains oligomers for example in the range from 5 to 30 monomer units or/and polymers in the form of a network arising therefrom. The term "coating" within the meaning of this application refers to the coating formed with the aqueous composition, including the wet film, the partially dry film, the completely dry film, the film dried at elevated temperature and the film optionally crosslinked further by heat or/and by irradiation.

In the process according to the invention at least one hydrolysable or/and at least one at least partially hydrolysed silane can preferably be included as the silicon compound in the aqueous silane composition. At least one monosilyl silane, at least one bis-silyl silane or/and at least one tris-silyl silane can preferably be included in the aqueous silane composition, in particular at least one monosilyl silane or/and at least one bis-silyl silane. The aqueous silane composition particularly preferably contains at least one silane having at least one nitrogen atom, in particular having at least one nitrogen-containing group. At least one alkoxysilane, at least one aminosilane, at least one epoxysilane or/and at least one vinylsilane, in particular a mixture of at least two different silanes, particularly preferably a mixture of at least two different nitrogen-containing silanes, such as for example a mixture of at least two different aminosilanes, can preferably be included in the aqueous composition. In particular, such silanes/siloxanes in the aqueous silane composition as have a chain length in the range from 2 to 5 C atoms and a functional group, wherein the latter can optionally be suitable for reacting with polymers, are particularly preferred in some embodiments. The composition can contain in particular a mixture of at least two silanes, such as for example 1.) at least two different aminosilanes, such as for example 2.) at least one bis-silyl silane such as for example bis-silyl aminosilane having at least one monoaminosilane, such as for example 3.) at least one aminosilane having at least one alkoxysilane such as for example trialkoxysilyl propyl tetrasulfane, or such as for example 4.) at least one vinylsilane having at least one bis-silyl silane such as for example a bis-silyl aminosilane, or such as for example 5.) at least one silane having a nitrogen-containing group and at least one silane having at least two nitrogen-containing groups or/and having at least two nitrogen atoms. It is most particularly preferable for the aqueous composition to contain at least one monoaminosilane (having 1 amino group in the molecule), at least one diaminosilane (having 2 amino groups in the molecule), at least one dialkoxysilane or/and at least one trialkoxysilane (having respectively 2 or 3 alkoxy groups in the molecule). At least one trialkoxysilane such as for example a bis-(trialkoxysilylalkyl)amine or a combination of at least one trialkoxysilane such as for example a bis-(trialkoxysilylalkyl)amine with at least one monoaminosilane such as for example a gamma-aminopropyl trialkoxysilane is particularly preferably used.

The aqueous composition preferably contains at least one silane selected from the group of
glycidoxyalkyltrialkoxysilane,
methacryloxyalkyltrialkoxysilane,
(trialkoxysilyl)alkyl succinic acid silane,
aminoalkylaminoalkylalkyldialkoxysilane,
(epoxycycloalkyl)alkyltrialkoxysilane,
bis-(trialkoxysilylalkyl)amine,
bis-(trialkoxysilyl)ethane,
(epoxyalkyl)trialkoxysilane,
N-(trialkoxysilylalkypalkylenediamine,
N-(aminoalkyl)aminoalkyltrialkoxysilane,
N-(trialkoxysilylalkyl)dialkylenetriamine,
poly(aminoalkyl)alkyldialkoxysilane,
ureidoalkyltrialkoxysilane and
acetoxysilane.

The aqueous composition preferably contains at least one silane selected from the group of
3-glycidoxypropyltriethoxysilane,
3-glycidoxypropyltrimethoxysilane,
3-methacryloxypropyltriethoxysilane,
3-methacryloxypropyltrimethoxysilane,
3-(triethoxysilyl)propyl succinic acid silane,
aminoethylaminopropylmethyldiethoxysilane,
aminoethylaminopropylmethyldimethoxysilane,
bis(triethoxysilylpropyl)amine,
bis(trimethoxysilylpropyl)amine,
(3,4-epoxybutyl)triethoxysilane,
(3,4-epoxybutyl)trimethoxysilane,
gamma-aminopropyltriethoxysilane,
gamma-aminopropyltrimethoxysilane,
gamma-ureidopropyltrialkoxysilane,
N-(3-(trimethoxysilyppropypethylenediamine.
N-beta-(aminoethyl)-gamma-aminopropyltriethoxysilane,
N-beta-(aminoethyl)-gamma-aminopropyltrimethoxysilane,
N-(gamma-triethoxysilylpropyl)diethylenetriamine,
N-(gamma-trimethoxysilylpropyl)diethylenetriamine,
N-(gamma-triethoxysilylpropyl)dimethylenetriamine,
N-(gamma-trimethoxysilylpropyl)dimethylenetriamine,
poly(aminoalkyl)ethyldialkoxysilane,
poly(aminoalkyl)methyldialkoxysilane and
vinyltriacetoxysilane.

Particularly preferred silicon compounds are bis-(3-trimethoxysilylpropyl)amine, bis-(3-triethoxysilylpropyl)amine, 3-aminopropyltriethoxysilane, bis-(triethoxysilyl)ethane, phenylaminopropyltrimethoxysilane, 3-(triethoxysilyl)propyl succinic acid anhydride, and tri-amino-organofunctional silane such as e.g. 3,5,7-triaminotrimethoxysilane.

In some embodiments or with the use of some silanes it can be sensible or necessary to hydrolyse at least one silane in advance or/and to pre-dissolve it first in an organic solvent or in an aqueous solvent blend. This can sometimes help to give the silane composition greater stability and to prevent precipitations in the aqueous solution. In the process according to the invention the aqueous composition containing silane/silanol/siloxane/polysiloxane preferably contains a total content of silane/silanol/siloxane/polysiloxane in the range from 0.01 to 8 g/l, preferably in the range from 0.03 to 5 g/l or from 0.1 to 4 g/l.

In some embodiments the aqueous composition containing silane/silanol/siloxane/polysiloxane preferably contains a) at least one compound selected from silanes, silanols, siloxanes and polysiloxanes, b) at least one compound containing titanium, hafnium or/and zirconium, optionally c) at least one type of cation selected from cations of metals of the $1^{st}$ to $3^{rd}$ and $5^{th}$ to $8^{th}$ subgroup including lanthanides and the $2^{nd}$ main group of the periodic table or/and at least one corresponding compound and optionally at least one substance d) selected from: $d_1$) silicon-free compounds each having at least one amino, urea (=ureido), imido or/and imino group, $d_2$) anions of nitrite or/and compounds having at least one nitro group, $d_3$) compounds based on peroxide and $d_4$) phosphorus-containing compounds, anions of at least one phosphate or/and anions of at least one phosphonate and moreover e) water and f) optionally also at least one organic solvent such as for example an alcohol.

The corresponding fluorine-containing acids and their salts as well as zirconium carbonates are particularly preferred as the compound containing titanium, hafnium or/and zirconium. The weight ratio Z in the aqueous composition containing silane/silanol/siloxane/polysiloxane of the sum of titanium, hafnium or/and zirconium calculated as metal to silane calculated as silane monomer is preferably in the range from 1:1 to 10:1, particularly preferably in the range from 1.5:1 to 5:1 or from 2:1 to 3:1. The weight ratio F in the aqueous composition containing silane/silanol/siloxane/polysiloxane of the total content of fluorine ($F_{total}$) to silane calculated as silane monomer is preferably in the range from 5:1 to 100:1, particularly preferably in the range from 10:1 to 50:1 or from 20:1 to 35:1—provided that at least one fluorine-containing substance has been added. The corrosion protection of the corresponding coatings produced with such aqueous compositions containing silane/silanol/siloxane/polysiloxane is usually poorer if they have weight ratios Z or/and F outside the aforementioned broadest range.

Cations of cerium, iron, calcium, copper, magnesium, titanium, yttrium, zinc, tin or/and zirconium are preferred in particular as cations—particularly if an electrodeposition paint is then applied. In some embodiments the aqueous composition containing silane/silanol/siloxane/polysiloxane can moreover also contain at least one organic oligomer or/and organic polymer, at least one amine, at least one base, at least one complexing agent, at least one surfactant, at least one type of inorganic particle or/and at least one inorganic or/and organic acid or/and at least one derivative thereof. The content of additives from 1.) the aforementioned cations, from 2.) organic monomers, oligomers and polymers, from 3.) amines, from 4.) bases, from 5.) complexing agents, from 6.) surfactants, from 7.) inorganic particles or/and from 8.) inorganic or/and organic acids or/and at least one derivative thereof is in each case preferably zero or approximately zero or 0.001 to 1 g/l, particularly preferably 0.005 to 0.1 g/l or 0.01 to 0.05 g/l. In addition, a catalyst such as for example acetic acid can be added or/and included. The addition of at least one acid constituent can help to pickle the metallic surface a little and ensure a better adhesion of the silane coating to the metallic surface.

In the process according to the invention the aqueous composition containing silane/silanol/siloxane/polysiloxane preferably has a pH in the range from 3 to 11, mostly 3.5 to 5.5. In the process according to the invention the aqueous composition containing silane/silanol/siloxane/polysiloxane preferably has a temperature in the range from 5 to 80° C., particularly preferably in the range from 15 to 55° C., when contact is made with the metallic surface. In the process according to the invention the aqueous composition containing silane/silanol/siloxane/polysiloxane is preferably applied by spraying or dipping—in the case of coils and sheets optionally also by roll coating and optionally also then by squeegeeing, in particular over a time in the range from 0.1 to 120 seconds, particularly preferably in the range from 10 to 70 seconds.

The content of at least one complex fluoride, salts thereof or/and esters thereof in the silane composition, based in particular on titanium, hafnium, zirconium or/and aluminium, is preferably 0.05 to 2 g/l, particularly preferably 0.4 to 1.5 g/l. Particularly preferably only such compounds based on titanium, hafnium or/and zirconium are present. The content of free fluoride in the silane composition is preferably in the range from 0.001 to 0.2 g/l, particularly preferably in the range from 0.003 to 0.1 g/l. Excessively high contents of free fluoride can lead to a matt appearance. The content of total fluoride $F_{total}$ in the silane composition is preferably in the range from 0.005 to 2 g/l. The content of cations of aluminium, magnesium or/and titanium in the silane composition is preferably in the range of approximately 0 or approximately 5 to 500 mg/l for each cation type, in the case of titanium particularly if no titanium compound was intentionally added but derives from pickling of metallic surfaces or/and from entrainments, for example.

The coating weights of the coatings produced with the aqueous composition containing silane/silanol/siloxane/polysiloxane are often preferably in the range from 10 to 150 mg of silane per $m^2$ of metallic surface, particularly in the range from 30 to 90 mg of silane per $m^2$ or/and often preferably in the range from 1 to 20 mg of Si calculated as metal per $m^2$ of metallic surface, particularly in the range from 2 to 12 or from 3 to 8 mg of Si per $m^2$. The coating thicknesses of the coatings produced with the aqueous composition containing silane/silanol/siloxane/polysiloxane are often preferably in the range from 10 to 300 nm, particularly preferably in the range from 20 to 200 nm, from 25 to 150 nm or from 30 to 100 nm.

In the process according to the invention the metallic surfaces are preferably rinsed with water before or/and after being brought into contact with an aqueous composition containing silane/silanol/siloxane/polysiloxane or/and before or/and after being brought into contact with an aqueous composition containing at least one phosphone compound. This has the advantage that too thick a coating cannot form, which in the corrosion test can lead to blistering under the paint. It is preferable here for the silane coating not to dry completely but to be coated with the phosphonate coating in a wet or partially dried state. This has the advantage moreover that individual phosphonates can be incorporated into the silane coating more easily than in the dried state. Alternatively the silane coating can be well dried before it is coated with a phosphonate coating.

At least one rinse with water is optionally performed after application of the composition with silane/silanol/siloxane/polysiloxane or/and of the composition with phosphone compound(s).

The aqueous composition containing silane/silanol/siloxane/polysiloxane or silane/silanol/siloxane is preferably applied to a cleaned, degreased, rinsed or/and pickled metallic surface, to a fresh metallic surface, e.g. following "zinc plating" with an aluminium-rich zinc alloy or a zinc-rich aluminium alloy, or to a pre-annealed (pre-tempered) surface or to a machined surface. The aluminium surface for coating is preferably as free as is technically possible from OH groups or has only a comparatively thin hydroxide layer with a film thickness of at most a few nanometers. The film thickness is often very much thinner than 0.01 µm and with high-quality cleaning of the metallic surfaces even usually in the range from 0.001 to 0.003 µm, so that aluminium-rich surfaces are always metallically bright prior to coating according to the invention. All treatment steps that build up a significant hydroxide/oxide layer and in particular a thick hydroxide or/and oxide layer, e.g. with a film thickness in the range from 0.03 to 5 µm, are preferably omitted.

In the process according to the invention the metallic surfaces are preferably cleaned, degreased or/and pickled before being brought into contact with an aqueous composition containing silane/silane/siloxane/polysiloxane.

In the process according to the invention metallic surfaces based on aluminium, magnesium, iron, steel, titanium, zinc, tin or/and alloy(s) thereof are preferably treated.

The compounds of the type XYZ preferably have an alkyl chain Y having 10 to 14 C atoms. The alkyl chain Y most particularly preferably has 12 C atoms. At least one of the phosphone compounds is particularly preferably a compound of the type XYZ, wherein X is a COOH, $HSO_4$, $(OH)_2PO$, $(OH)_2PO_2$, $(OH)(OR')PO$ or $(OH)(OR')PO_2$ group, wherein Y is mutually independently an unbranched alkyl group having 8 to 16 C atoms or an alkyl group having 8 to 16 C atoms, of which up to 20% of the C atoms of the alkyl chain exhibit a functional group, wherein Z is an (OH)$_2$PO, (OH)$_2$PO$_2$, (OH)(OR')PO or (OH)(OR')PO$_2$ group, wherein R' is an alkyl group having 1 to 4 C atoms and wherein R" is an H atom or an alkyl group having 1 to 4 C atoms. Generally the functional groups optionally bound to the alkyl chain Y are preferably mutually independently at least one of the groups cited for X. These are particularly preferably present mutually independently as OH groups or as vinyl groups. The compounds of the type XYZ are often suitable for forming self-assembling molecules (SAM), which can form a layer of these self-assembling molecules on the surface coated with the aforementioned aqueous silane-containing solution, optionally in some cases also in the silane layer. This is often in particular an approximately monomolecular layer. In many cases Y forms a linear unbranched chain. Y is often mutually independently a linear unbranched straight-chain chain or a branched chain having one or two functional groups. The particularly advantageous compounds of the type XYZ often have a group Y, which has an even number of C atoms. In some embodiments at least one compound of the type XYZ can be present in an aqueous solution as a salt, ester or/and acid. The at least one compound of the type XYZ is mostly present as an acid or a salt, wherein small amounts of ester(s) can often also occur. Group Y of the particularly advantageous compounds of the type XYZ is particularly preferably an unbranched straight-chain alkyl group having 8 to 16 or 10 to 14 or 12 C atoms. In a mixture with a plurality of phosphonates the compounds of the type XYZ are preferably included in proportions by weight such that the latter have alkyl chains having an average number of C atoms in the range from 9 to 14, particularly preferably in the range from 10 to 13 or from 11 to 12.5, or of approximately around 12 C atoms. At least 95% or 100% of all (molecules of) phosphone compounds are preferably selected from compounds of the type XYZ. At least one compound of the type XYZ in which X is an (OH)$_2$PO$_2$ or (OH)(OR')PO$_2$ group is particularly preferred. At least one of the following compounds of the type XYZ or/and at least one of the corresponding derivatives, in particular salts thereof or/and esters thereof, is most particularly preferred:

1,8-octanediphosphonic acid,
1,10-decanediphosphonic acid,
1,12-dodecanediphosphonic acid,
1,12-dodecanediphosphonic acid having approx. 8% vinyl groups on the alkyl chain Y,
1,14-tetradecanediphosphonic acid,
1-phosphonic acid-12-mercaptododecane,
1-phosphonic acid-8-(N-ethylamino)octane,
1-phosphonic acid-10-(N-ethylamino)decane,
1-phosphonic acid-12-(N-ethylamino)dodecane,
1-phosphonic acid-14-(N-ethylamino)tetradecane,
1-phosphonic acid-12-carboxyldodecane,
1-phosphonic acid-12-hydroxydodecane,
1-phosphonic acid-8-aminooctane,
1-phosphonic acid-10-aminodecane,
1-phosphonic acid-12-aminododecane,
1-phosphonic acid-14-aminotetradecane,
1-phosphonic acid-12-acryloyldodecane.

In some embodiments at least one compound of the type XYZ is included in an aqueous solution in which in particular 0.01 to 50 wt. % of the water is replaced by at least one organic solvent such as for example an alcohol having 1 to 8 C atoms, by acetone, by dioxane or/and by tetrahydrofuran.

The aqueous composition containing phosphone compounds preferably has at least one compound of the type XYZ in a concentration in the range from 0.0008 to 10 g/l, particularly preferably in the range from 0.004 to 5 g/l, above all in the range from 0.04 to 0.5 g/l. The total content of phosphone compounds in the aqueous composition containing phosphone compounds is preferably in the range from 0.001 to 10 g/l, particularly preferably in the range from 0.005 to 5 g/l, above all in the range from 0.05 to 0.5 g/l. In many embodiments the aqueous composition containing phosphone compounds has at least one compound of the type XYZ which is in the range of or below the critical micelle concentration.

In some embodiments the aqueous composition containing phosphone compounds contains at least one compound of the type XYZ which is present in the solution as a salt. In individual embodiments the aqueous composition containing phosphone compounds substantially has only or only compounds of the type XYZ—optionally including at least one of the corresponding derivatives—in addition to at least one solvent such as for example water. The at least one phosphone compound is preferably included in water or in a water-solvent blend in a content of 0.005 to 10 g/l, particularly preferably in a content of 0.05 to 1 or 0.1 to 0.6 g/l. Surfactants in particular can be added in addition. The aqueous composition containing at least one phosphone compound preferably includes at least one phosphone compound based on phosphonic acid, diphosphonic acid, esters thereof or/and salts thereof.

In some embodiments the aqueous composition containing phosphone compounds optionally contains in addition to water or in addition to a water/solvent blend and in addition to at least one compound of the type XYZ at least one biocide, at least one demulsifier, at least one fragrance, at least one emulsifier, at least one defoamer, at least one solubiliser, at least one surfactant, at least one agent for adjusting the pH, at least one agent for adjusting the electrical conductivity, at least one other auxiliary substance, at least one at least one organic oligomer, at least one organic polymer, at least one organic copolymer, at least one amine or/and at least one complexing agent. It can contain substances of each of these cited additives in a content of in each case 0.0005 to 5 g/l and particularly preferably in a content of in each case 0.001 to 2 or 0.1 to 0.8 g/l, in the case of the organic oligomers, organic polymers and organic copolymers however in an amount of in each case 0.0005 to 5 g/l, wherein the sum of all these additives is less than the total amount of phosphone compounds in the solution containing phosphone compound(s) according to the invention. The content of cations of aluminium, magnesium or/and titanium in the aqueous composition containing at least one phosphone compound is preferably in the range of approximately 0 or approximately 5 to 500 mg/l for each type of cation.

The aqueous composition containing at least one phosphone compound preferably has a pH in the range from 1.5 to 9.0, particularly preferably in the range from 2.0 to 4.0. The aqueous composition containing at least one phosphone compound preferably has a temperature in the range from 5 to 80° C., particularly preferably in the range from 20 to 65° C., when contact is made with the metallic surface. The aqueous composition containing at least one phosphone compound is preferably applied by dipping, spattering, spraying or misting. It is moreover preferable for the phosphonate coating to be covered with at least one coat of a primer, a paint or/and an adhesive.

The aqueous composition containing phosphone compounds is preferably applied to the precoated metallic surfaces by dipping or/and by roller coating, in particular by spattering, spraying or misting, in particular over a time in the range from 0.1 to 120 seconds.

It was surprising that the corrosion and paint adhesion tests were poorer when coating was performed first with phosphonate(s) and then with silane(s) than when coating was performed first with silane(s) and then with phosphonate(s).

It was moreover surprising that in all tests in which coating took place in the first stage with silane(s) and in the second step with phosphonate(s), the corrosion and paint adhesion tests were always markedly better or even very much better than if treatment was carried out with silane(s) or phosphonate(s) in just one stage, when the same silane or the same phosphonate solutions were used for each test.

It was furthermore surprising that in an aqueous solution containing titanium fluoride and zirconium fluoride, when the silane content of the aqueous silane composition is reduced or even omitted whilst keeping the Ti and Zr content constant, with the same inorganic component, the precipitation of titanium and the precipitation of zirconium increased only slightly, from 36 mg/m$^2$ to 40 mg/m$^2$ and from 21 mg/m$^2$ to 23 mg/m$^2$ respectively. At the same time, however, the appearance of the conversion coatings changed from transparent and highly glossy (very good) (E 25) to matt white, in some cases to very matt (very poor) (CE 43). The result was thus an unsalable surface quality. For a good surface quality the content of silane in the aqueous solution must therefore be at least 0.01 g/l.

The metallic substrates coated according to the invention and the metallic products coated according to the invention can be used in particular in automotive construction, vehicle construction, aircraft construction or/and façade construction. Above all the metallic products coated according to the invention can be used for the production of wheels from an aluminium alloy. The conversion coatings according to the invention are used here in particular simultaneously for corrosion protection and as a coupling agent.

EXAMPLES AND COMPARATIVE EXAMPLES

The examples according to the invention (E) and comparative examples (VE) described below are intended to illustrate the subject matter of the invention in more detail.

Wheel sections (=spokes) made from the aluminium alloy AlSi7, which is conventionally used for aluminium wheels in automotive construction, are used as specimens. The coated surface area of the substrates was in most cases approximately 100 cm$^2$ (measured over all surfaces).

The aqueous bath compositions are produced as mixtures corresponding to Table A, using prehydrolysed silanes. They each contain predominantly a silane and optionally also small amounts of at least one similar further silane, the term silane being used for the sake of simplicity rather than silane/silanol/siloxane/polysiloxane, and this variety of compounds, in some cases with a relatively large number of similar compounds, generally continuing through to the formation of the coating, so that several similar compounds are often also present in the coating. Depending on the silane, prehydrolisation can also continue over several days at room temperature with vigorous stirring, if the silanes to be used are not already in prehydrolysed form. To prehydrolyse the silane it is poured into water in excess and optionally catalysed, for example with acetic acid. Acetic acid was added only to certain embodiment variants, solely in order to adjust the pH. In some embodiment variants acetic acid is already included as a catalyst for hydrolysis. Ethanol forms during hydrolysis but is not added. The finished mixture is used whilst fresh.

For each test, at least five machine-polished aluminium wheel sections in the form of spokes made from the aluminium alloy AlSi7, as is conventionally used for aluminium-based cast metal wheels, which had previously been cleaned with an aqueous alkaline detergent and rinsed with tap water, are cleaned.

Depending on the variant, the parts are pickled with an acid pickle based on nitric acid or sulfuric acid with fluoride, and rinsed with demineralised water. The spokes of the wheels are then brought into contact with the corresponding pretreatment liquid from Table A at 30° C. to 50° C. by spraying. The parts are then rinsed with demineralised water. The spokes treated in this way are in some cases dried at 140° C. PMT and then painted with a clear acrylic powder coating.

Alternatively the spokes undergo a further (wet-in-wet) treatment. After treatment, the spokes are treated with the corresponding pretreatment liquid from Table A at 30° C. to 50° C. by spraying and then the coating formed is rinsed at room temperature at least once with demineralised water whilst wet.

Each silane that was added to the silane-containing solution was partially or completely hydrolysed in advance. The silanes are in a largely or approximately completely hydrolysed state in the aqueous solution. The pH was optionally adjusted with an additive such as for example sodium hydroxide solution or acetic acid, for hydrolysis in particular. The compositions of the silane compositions are set out in Table A.

Silane Types:
1 Bis-(3-triethoxysilylpropyl)amine
2 Aminopropyltriethoxysilane
3 Aminopropyltrimethoxysilane
4 N-beta-(Aminoethyl)-gamma-aminopropyltriethoxysilane
5 3-Aminopropyltrimethoxysilane
6 N-(n-Butyl)-3-aminopropyltrimethoxysilane
7 2-Aminoethyl-3-aminopropylmethyldimethoxysilane
8 Bis-(3-trimethoxysilylpropyl)amine
9 3-Ureidopropyltriethoxysilane
10 N-(2-Aminoethyl)-3-aminopropyltrimethoxysilane.

The complex fluorides of titanium or/and zirconium in the form of at least one acid or/and at least one salt are used largely on the basis of an MeF$_6$ complex. The complex fluoride solution is mixed into the aqueous silane composition. Furthermore, in the case of silicon-containing metallic surfaces a small amount of complex fluorides based on silicon can additionally also be formed, owing to the pickling effect.

Surprisingly, an addition of a manganese salt to the aqueous silane composition in a preliminary test proved to be disadvantageous and was therefore omitted in subsequent tests.

The silanes contained in the aqueous composition—concentrate or/and bath—are monomers, oligomers, polymers, copolymers or/and reaction products with further components based on hydrolysis reactions, condensation reactions or/and further reactions.

The reactions take place above all in the solution, in reactions between the coating from Table A and Table B, during drying and optionally also during curing of the coating, in particular at temperatures over 70° C. All concentrates and baths proved to be stable over a period of one week, with no changes and no precipitations. No ethanol was added. Ethanol contents in the compositions derived only from chemical reactions.

The compositions and properties of the treatment baths and the properties of the coatings are summarised in Tables A to C. The pH of the silane compositions is adjusted in most examples and comparative examples, with ammonia in the presence of at least one complex fluoride and with an alkaline solution in other cases. All baths exhibit a good solution quality and almost always a good bath stability. There were sometimes slight precipitations in the baths. After coating with the silane-containing solution, the silane-containing coating is first rinsed once with demineralised water without any significant drying. The coated spokes are in some cases then dried for 20 minutes in a drying oven at 160° C.

Alternatively the spokes undergo a further (wet-in-wet) treatment. After rinsing with demineralised water the spokes are brought into contact with the phosphonate-containing solution at 55° C. by spraying. Phosphonate compositions with no further additives were used for this purpose in most cases. The compositions of the phosphonate compositions are set out in Table B.

Phosphonate Types:

1 1-Phosphonic acid-12-dodecane
2 1,12-Dodecanediphosphonic acid having approx. 8% vinyl groups on the alkyl chain
3 1,10-Decanediphosphonic acid
4 1,8-Octanediphosphonic acid
5 1-Phosphonic acid-8-(N-ethylamino)octane
6 1-Phosphonic acid-10-(N-ethylamino)decane
7 1-Phosphonic acid-12-(N-ethylamino)dodecane
8 1-Phosphonic acid-12-hydroxydodecane
9 1-Phosphonic acid-10-aminodecane
10 1-Phosphonic acid-12-aminododecane.

All baths exhibit a good solution quality and always a good bath stability. The parts are then rinsed with demineralised water. The coated spokes are then dried for 20 minutes at 160° C. in a drying oven and then painted with a clear acrylic powder coating.

The uniformity of the coating is assessed by means of a visual inspection of the coatings. No or virtually no marks or runs (often in the form of whitish, somewhat thick and longish discolorations) must be visible. The optical quality must not be inferior to the turned aluminium alloy surfaces, at least following application of at least one clear lacquer or at least one clear powder coating. The spokes were then tested for their corrosion protection and their paint adhesion.

The examples were performed using the process steps listed below:

Sequence 1: Pickle Based on Nitric Acid+Silane+Phosphonate a) The substrate surfaces were cleaned and thoroughly degreased in a 5% solution of a mildly alkaline detergent for 3 minutes at 65° C.
b) This was followed by rinsing with tap water for 1.0 minutes at room temperature.
c) Then they were treated with a pickle consisting of a 5% solution based on nitric acid and fluoride for 1 minute at 30° C.
d) This was followed by rinsing with demineralised water for 1 minute.
e) The surfaces were then coated by spraying with a silane-containing solution for 1 minute at temperatures in the range from room temperature to 50° C. The silane-containing solutions and application parameters are listed in Table A.
f) This was followed by first rinsing with demineralised water for 1 minute.
g) Then the coated surfaces were coated by spraying with a phosphonate-containing solution for 1 minute at 55° C. The phosphonate-containing solutions used are listed in Table B.
h) This was followed by rinsing with demineralised water for 1 minute.
i) The coated substrates were then dried in a drying oven at 160° C. for 20 minutes.
j) Finally the dry specimens were coated with a clear powder coating based on acrylate, which corresponds to the conventional paint system used in the automotive supply industry for aluminium wheels. The entire 1-layer paint system had a coating thickness of 80 to 120 μm and was clear and colourless.

Sequence 2: Pickle Based on Sulfuric Acid+Silane+Phosphonate

The procedure differed from sequence 1 only in the fact that treatment was carried out using a pickle comprising a 2.7% solution based on sulfuric acid and fluoride.

Sequence 3: Pickle Based on Nitric Acid+Silane (for Comparative Examples)

The procedure differed from sequence 1 only in the fact that steps g) and h) are omitted.

Sequence 4: Pickle Based on Nitric Acid+Phosphonate+Silane (for Comparative Examples)

The procedure differed from sequence 1 only in the fact that the sequence of steps e) and g) is reversed.

Sequence 5: Pickle Based on Sulfuric Acid Phosphonate+Silane (for Comparative Examples)

The procedure differed from sequence 1 only in the fact that treatment was carried out using a pickle comprising a 2.7% solution based on sulfuric acid and fluoride and that the sequence of steps e) and g) is reversed.

TABLE A

Compositions of silane-containing solutions and for comparison purposes of individual similar solutions (baths) with contents given in g/l relative to solids and active ingredient contents, in the case of silanes relative to the weight of non-hydrolysed silanes; residual content: water and in most cases a very small amount of ethanol; process data; "+" indicates a small content.

| Contents in g/l/solution no. | 1 | 2 | 3 | 4 | 5 | 6 | 7 | 8 | 9 |
|---|---|---|---|---|---|---|---|---|---|
| Silane type 1: | 2 | 2 | 10 | 10 | — | 10 | 2 | 10 | — |
| Silane content | 0.16 | 0.16 | 0.08 | 0.098 | — | 0.32 | 1.38 | 0.32 | — |
| Silane type 2: | — | — | — | — | — | — | 1 | — | — |
| Silane content | — | — | — | — | — | — | 2.85 | — | — |
| Ti | — | — | 0.044 | 0.044 | — | 0.212 | — | — | — |
| Zr | 0.096 | 0.96 | 0.083 | 0.083 | 0.443 | 0.4 | — | 0.443 | 0.096 |
| Fluoride Ftotal | 0.12 | 0.12 | 0.161 | 0.161 | 0.55 | 1.0 | — | 0.55 | 0.12 |
| Carbonate | 0.129 | 0.129 | 0.146 | 0.146 | — | 0.528 | — | — | 0.129 |
| Nitrate | — | — | 0.130 | 0.130 | — | — | — | — | — |
| Acetic acid | — | — | — | — | — | — | — | — | — |

TABLE A-continued

Compositions of silane-containing solutions and for comparison purposes of individual similar solutions (baths) with contents given in g/l relative to solids and active ingredient contents, in the case of silanes relative to the weight of non-hydrolysed silanes; residual content: water and in most cases a very small amount of ethanol; process data; "+" indicates a small content.

| | | | | | | | | | |
|---|---|---|---|---|---|---|---|---|---|
| Ammonium | — | — | — | — | 0.175 | — | — | 0.175 | — |
| Sodium hydroxide solution | + | + | + | + | — | + | + | + | + |
| Conductance μS/cm | 510 | 1020 | 810 | 1450 | 1080 | n.d. | n.d. | n.d. | n.d. |
| Bath temperature ° C. | RT | RT | RT | RT | RT | RT | 28 | RT | RT |
| pH | 2.9 | 3.0 | 4.2 | 4.2 | 4.5 | 4.2 | 4.2 | 3.0 | 3.0 |

| Contents in g/l/solution no. | 10 | 11 | 12 | 13 | 14 | 15 | 16 | 17 | 18 |
|---|---|---|---|---|---|---|---|---|---|
| Silane type 1: | 2 | 2 | 10 | 10 | 2 | — | 2 | 10 | 2 |
| Silane content | 0.16 | 0.16 | 0.16 | 0.15 | 2.9 | — | 0.16 | 0.165 | 0.08 |
| Silane type 2: | — | 1 | — | — | 10 | — | — | — | — |
| Silane content | — | 0.95 | — | — | 0.96 | — | — | — | — |
| Ti | — | — | — | — | — | — | 0.053 | 0.053 | 0.0265 |
| Zr | 0.096 | — | 0.222 | 0.09 | — | 0.222 | 0.1 | 0.1 | 0.05 |
| Fluoride $F_{total}$ | 0.12 | — | 0.275 | 0.11 | — | 0.275 | 0.25 | 0.25 | 0.125 |
| Carbonate | 0.129 | — | — | 0.195 | — | — | 0.132 | 0.132 | 0.066 |
| Acetic acid | — | 0.126 | — | — | — | — | — | — | — |
| Ammonium | — | — | 0.088 | — | — | 0.088 | — | — | — |
| Nitrate | — | — | — | 0.173 | — | — | — | — | — |
| Ethanol | — | 0.388 | — | — | — | — | — | — | — |
| Sodium hydroxide solution | + | — | + | + | — | — | + | + | + |
| Surfactant | — | + | — | — | — | — | — | — | — |
| Conductance μS/cm | 280 | 90 | 680 | 470 | n.d. | 680 | 635 | 590 | 345 |
| Bath temperature ° C. | 30 | 30 | 30 | 30 | 50 | 30 | 30 | 30 | 30 |
| pH | 4.2 | 5.2 | 4.4 | 4.2 | 4.1 | 4.1 | 4.2 | 4.2 | 4.2 |

| Contents in g/l/solution no. | 19 | 20 | 21 | 22 | 23 | 24 | 25 | 26 | 27 |
|---|---|---|---|---|---|---|---|---|---|
| Silane type 1: | 2 | 2 | 2 | 2 | 10 | 10 | — | 10 | 2 |
| Silane content | 0.24 | 0.32 | 0.16 | 0.32 | 0.185 | 0.45 | — | 0.093 | 0.16 |
| Silane type 2: | — | — | — | — | 8 | — | — | 8 | — |
| Silane content | — | — | — | — | 0.265 | — | — | 0.133 | — |
| Ti | 0.159 | 0.105 | 0.053 | — | — | 0.053 | 0.053 | — | — |
| Zr | 0.3 | 0.2 | 0.1 | 0.20 | 0.20 | 0.1 | 0.1 | 0.1 | 0.1 |
| Fluoride $F_{total}$ | 0.375 | 0.5 | 0.25 | 0.27 | 0.27 | 0.25 | 0.25 | 0.135 | 0.135 |
| Carbonate | 0.198 | 0.264 | 0.132 | 0.619 | 0.619 | 0.132 | 0.132 | 0.310 | 0.310 |
| Nitrate | — | — | — | 0.779 | 0.779 | 0.237 | — | 0.509 | 0.390 |
| Acetic acid | — | — | — | — | — | — | — | — | — |
| Sodium hydroxide solution | + | + | + | + | + | + | + | + | + |
| Surfactant | — | — | + | — | — | — | — | — | — |
| Conductance μS/cm | 920 | 1150 | n.d. | n.d. | n.d. | n.d. | n.d. | n.d. | n.d. |
| Bath temperature ° C. | 30 | 30 | 30 | 30 | 30 | 30 | 30 | 30 | 30 |
| pH | 4.2 | 4.2 | 4.2 | 4.2 | 4.2 | 4.2 | 4.2 | 4.2 | 4.2 |

| Contents in g/l/solution no. | 28 | 29 | 30 | 31 | 32 | 33 | 34 | 35 | 36 |
|---|---|---|---|---|---|---|---|---|---|
| Silane type 1: | 2 | 1 | 3 | 4 | 5 | 6 | 7 | 8 | 9 |
| Silane content | 2.9 | 0.24 | 0.24 | 0.24 | 0.24 | 0.24 | 0.24 | 0.24 | 0.24 |
| Silane type 2: | 10 | — | — | — | — | — | — | — | — |
| Silane content | 0.96 | — | — | — | — | — | — | — | — |
| Ti | 0.01 | 0.159 | 0.159 | 0.159 | 0.159 | 0.159 | 0.159 | 0.159 | 0.159 |
| Zr | — | 0.3 | 0.3 | 0.3 | 0.3 | 0.3 | 0.3 | 0.3 | 0.3 |
| Fluoride $F_{total}$ | — | 0.375 | 0.375 | 0.375 | 0.375 | 0.375 | 0.375 | 0.375 | 0.375 |
| Carbonate | — | 0.198 | 0.198 | 0.198 | 0.198 | 0.198 | 0.198 | 0.198 | 0.198 |
| Acetic acid | — | — | — | — | + | — | — | — | — |
| Sodium hydroxide solution | — | + | + | — | — | + | + | + | + |
| Surfactant | — | — | — | — | — | — | — | — | — |
| Conductance μS/cm | n.d. | n.d. | n.d. | n.d. | n.d. | n.d. | n.d. | n.d. | n.d. |
| Bath temperature ° C. | 30 | 30 | 30 | 30 | 30 | 30 | 30 | 30 | 30 |
| pH | 10 | 4.8 | 3.2 | 8.7 | 3.8 | 4.2 | 4.2 | 4.4 | 4.9 |

TABLE B

Phosphonate-containing solutions

| Contents in g/l/solution type | A | B | C | D | E | F | G | H | I |
|---|---|---|---|---|---|---|---|---|---|
| Phosphonate type | 1 | 1 | 1 | 1 | 1 | 1 | 1 | 2 | 3 |
| Phosphonate amount | 0.25 | 1.20 | 0.25 | 0.25 | 0.25 | 0.25 | 0.25 | 0.25 | 1.20 |
| $H_2ZrF_6$ | — | — | 0.1 | — | — | — | — | — | — |
| Amine | — | — | — | 0.1 | — | — | — | — | — |
| Organic polymer | — | — | — | — | 0.1 | — | 0.1 | — | — |

TABLE B-continued

| Phosphonate-containing solutions | | | | | | | | | |
|---|---|---|---|---|---|---|---|---|---|
| Complexing agent | — | — | — | — | — | 0.1 | 0.1 | — | — |
| Conductance μS/cm | 227 | 451 | n.d. | n.d. | n.d. | 287 | n.d. | 288 | 462 |
| pH | 2.9 | 2.5 | 2.7 | 3.7 | 3.3 | 3.5 | 3.3 | 3.2 | 2.6 |

| Contents in g/l | J | K | L | M | N | O | P |
|---|---|---|---|---|---|---|---|
| Phosphonate type | 4 | 5 | 6 | 7 | 8 | 9 | 10 |
| Phosphonate amount | 0.25 | 1.20 | 0.25 | 0.25 | 0.25 | 0.25 | 0.25 |
| pH | 3.7 | 3.4 | 2.8 | 2.9 | 3.7 | 3.2 | 3.1 |

TABLE C

Coatings and test results on coated specimens in the form of spokes cut from wheels made from the aluminium alloy AlSi7.

| Example/comparative example | CE 1 | E 2 | CE 3 | E 4 | CE 5 | E 6 | CE 7 | E 8 |
|---|---|---|---|---|---|---|---|---|
| Silane composition | 1 | 1 | 2 | 2 | 3 | 3 | 4 | 4 |
| Phosphonate composition | — | A | — | A | — | A | — | A |
| Coating weight mg/m$^2$ for Ti | 28 | 27 | 42 | 36 | 38 | 33 | 27 | 29 |
| Coating weight mg/m$^2$ for Zr | 11 | 14 | 13 | 11 | 10 | 9 | 11 | 11 |
| Appearance | small runs | small runs | small runs | small runs | small runs | small runs | small runs | small runs |
| Gloss without paint | good | good | good | good | good | good | good | Good |
| Transparency | good | good | good | good | good | good | good | Good |
| Corrosion tests: | | | | | | | | |
| CASS test: scratch | <1 | <1 | 1.3 | 1.5 | 1.3 | <1 | <1 | <1 |
| Filiform test as per Daimler MU/LF | 1.7/7.0 | 1.2/5.5 | 0.5/4.5 | 0.8/4.0 | 1.4/5.3 | 1.1/5.8 | 1.7/6.0 | 1.6/6.0 |
| Filiform test as per GM | 4.5 | 2.5 | 1.5 | 1.5 | 2.8 | 2.8 | 2.3 | 2.0 |
| Paint adhesion tests: | | | | | | | | |
| Cross-hatch adhesion, dry | n.d. | n.d. | n.d. | n.d. | n.d. | n.d. | n.d. | n.d. |
| Cross-hatch adhesion after 10 d storage whilst wet + 1 h RT | n.d. | n.d. | n.d. | n.d. | n.d. | n.d. | n.d. | n.d. |
| Cross-hatch adhesion after 240 h CASS + 1 h RT | n.d. | n.d. | n.d. | n.d. | n.d. | n.d. | n.d. | n.d. |

| Example/comparative example | CE 9 | E 10 | CE 11 | CE 12 | CE 13 | CE 14 | CE 15 | CE 16 |
|---|---|---|---|---|---|---|---|---|
| Silane composition | 5 | 5 | 6 | 7 | 5 | 8 | 7 | 9 |
| Phosphonate composition | — | A | — | — | — | — | — | — |
| Coating weight mg/m2 for Ti | 28 | 28 | n.d. | n.d. | n.d. | n.d. | n.d. | n.d. |
| Coating weight mg/m2 for Zr | 17 | 19 | n.d. | n.d. | n.d. | n.d. | n.d. | n.d. |
| Appearance | good | good | matt | spots | matt | runs | runs | runs |
| Gloss without paint | good | good | poor | poor | poor | poor | poor | poor |
| Transparency | good | good | poor | poor | poor | poor | poor | poor |
| Corrosion tests: | | | | | | | | |
| CASS test: scratch | 1.0 | <1 | <1 | <1 | <1 | <1 | <1 | 2.5 |
| Filiform test as per Daimler MU/LF | 1.7/0.0 | 1.6/6.0 | 0.7/6.5 | 1.1/5.5 | 1.5/5.0 | 1.4/6.5 | 0.7/5.3 | 1.3/10.5 |
| Filiform test as per GM | 2.3 | 2.5 | 4.5 | 5.0 | 4.0 | 5.0 | 3.3 | 4.3 |
| Paint adhesion tests: | | | | | | | | |
| Cross-hatch adhesion, dry | n.d. | n.d. | Gt0 | Gt0 | Gt0 | Gt0 | Gt0 | Gt0 |
| Cross-hatch adhesion after 10 d storage whilst wet + 1 h RT | n.d. | n.d. | Gt1 | Gt0 | Gt0 | Gt1 | Gt0 | Gt0 |
| Cross-hatch adhesion after 240 h CASS + 1 h RT | n.d. | n.d. | n.d. | n.d. | n.d. | n.d. | n.d. | n.d. |

| Example/comparative example | E 17 | CE 18 | CE 19 | E 20 | E 21 | E 22 | E 23 | E 24 |
|---|---|---|---|---|---|---|---|---|
| Silane composition | 10 | 11 | 12 | 15 | 13 | 11 no rinse | 11 rinse | 14 |
| Phosphonate composition | A | — | — | A | A | A | A | A |
| Coating weight mg/m$^2$ for Ti | 0 | 0 | 0 | 0 | 0 | 0 | 0 | 0 |
| Coating weight mg/m$^2$ for Zr | 15 | 0 | 17 | 25 | 10 | 0 | 0 | 0 |
| Appearance | very good | small runs | very good | very good | small runs | cloudy | very good | runs |
| Gloss without paint | very good | good | very good | very good | good | poor | very good | poor |
| Transparency | very good | good | very good | very good | good | poor | very good | poor |

TABLE C-continued

Coatings and test results on coated specimens in the form of spokes cut from wheels made from the aluminium alloy AlSi7.

| Corrosion tests: | | | | | | | | |
|---|---|---|---|---|---|---|---|---|
| CASS test: scratch | 0.3 | 0.6 | 0.3 | 0.4 | 1.2 | 2.0 | 1.5 | 0.5 |
| Filiform test as per Daimler MU/LF | 1.4/5.5 | 2.3/7.5 | 1.8/5.5 | 1.3/5.5 | 1.2/6.0 | 1.8/6.0 | 1.9/9.5 | 3.2/11.5 |
| Filiform test as per GM | 2.3 | 11.5 | 3.3 | 3.8 | 4.0 | 5.3 | 3.5 | 6.5 |
| Paint adhesion tests: | | | | | | | | |
| Cross-hatch adhesion, dry | Gt0 | Gt0 | Gt0 | Gt0 | Gt0 | Gt1 | Gt0 | Gt0 |
| Cross-hatch adhesion after 10 d storage whilst wet + 1 h RT | Gt0 | Gt0 | Gt1-2 | Gt0 | Gt0 | Gt3 | Gt0 | Gt0 |
| Cross-hatch adhesion after 240 h CASS + 1 h RT | Gt0 | Gt0 | Gt0 | Gt0 | Gt0 | Gt3 | Gt1 | Gt0 |

| Example/comparative example | E 25 | E 26 | E 27 | CE 28 | CE 29 | E 30 | E 31 | E 32 |
|---|---|---|---|---|---|---|---|---|
| Silane composition/alternative compounds | 16 | 17 | 18 | — | Ti/ZrF$_6$ | 18 | 19 | 20 |
| Phosphonate comp./alternative compounds | A | A | A | Cr$^{6+}$ | A | A | A | A |
| Coating weight mg/m$^2$ for Ti | 36 | 21 | 0 | — | 3 | 17 | 30 | 20 |
| Coating weight mg/m$^2$ for Zr | 21 | 17 | 0 | — | 3 | 13 | 21 | 18 |
| Coating weight mg/m$^2$ for Cr | n.d. | n.d. | n.d. | 16 | n.d. | n.d. | n.d. | n.d. |
| Appearance without paint | very good | very good | very good | slightly yellow - poor | very good | good | small runs | small runs |
| Gloss without paint | very good | very good | very good | good | very good | good | good | good |
| Transparency with paint | very good | very good | very good | good | very good | good | good | good |
| Corrosion tests: | | | | | | | | |
| CASS test: scratch | <0.2 | <0.2 | <0.2 | <0.2 | 0.2 | 0.2 | 0.5 | 0.5 |
| Filiform test as per Daimler MU/LF | 0.9/4.0 | 1.9/6.0 | 1.7/5.5 | 2.4/7.0 | 2.3/6.0 | 1.4/5.8 | 1.1/4.5 | 1.6/5.5 |
| Filiform test as per GM | 2.5 | 4.5 | 4.0 | 5.0 | 4.0 | 5.0 | 4.8 | 4.8 |
| Paint adhesion tests: | | | | | | | | |
| Cross-hatch adhesion, dry | Gt0 | Gt0 | Gt0 | Gt0 | Gt0 | Gt0 | Gt0 | Gt0 |
| Cross-hatch adhesion after 10 d storage whilst wet + 1 h RT | Gt0-1 | Gt0-1 | Gt0-1 | Gt1 | Gt0-1 | Gt0-1 | Gt0-1 | Gt0-1 |
| Cross-hatch adhesion after 240 h CASS + 1 h RT | Gt0-1 | Gt0-1 | Gt0-1 | Gt0-1 | Gt0-1 | Gt0-1 | Gt0-1 | Gt0-1 |
| Steam test: paint detachment in mm | 0 | 0 | 0 | 0 | 0 | 0 | 0 | 0 |

| Example/comparative example | E 33 | E 34 | E 35 | E 36 | CE 37 | E 38 | CE 39 | E 40 |
|---|---|---|---|---|---|---|---|---|
| Silane composition | 16 | 19 | 19 | 21 | 37 | 37 | 23 | 23 |
| Phosphonate composition | A | A | B | A | — | A | — | A |
| Coating weight mg/m$^2$ for Ti | 8 | 12 | 8 | 5 | 1 | 1 | 1 | 1 |
| Coating weight mg/m$^2$ for Zr | 11 | 15 | 5 | 6 | 15 | 16 | 18 | 24 |
| Appearance without paint | small runs | small runs | very matt, very poor | very good | matt | matt | matt | matt |
| Gloss without paint | good | good | very matt, very poor | very good | matt | matt | matt | matt |
| Transparency with paint | good | good | n.d. | very good | matt | matt | matt | matt |
| Corrosion tests: | | | | | | | | |
| CASS test: scratch | 0.3 | 0.3 | n.d. | 1.7 | 1.7 | 0.2 | 1.2 | 1.2 |
| Filiform test as per Daimler MU/LF | 1.5/5.8 | 2.3/6.0 | n.d. | 1.9/5.5 | 1.6/6.5 | 0.9/4.5 | 1.5/4.5 | 1.5/4.5 |
| Filiform test as per GM | 3.5 | 4.0 | n.d. | 3.8 | 3.5 | 4.0 | 3.8 | 3.3 |
| Paint adhesion tests: | | | | | | | | |
| Cross-hatch adhesion, dry | Gt0 | Gt0 | n.d. | Gt0 | Gt0 | Gt0 | Gt0 | Gt0 |
| Cross-hatch adhesion after 10 d storage whilst wet + 1 h RT | Gt0-1 | Gt0-1 | n.d. | Gt0-1 | Gt1 | Gt0-1 | Gt1 | Gt0-1 |
| Cross-hatch adhesion after 240 h CASS + 1 h RT | Gt0-1 | Gt0-1 | n.d. | Gt0-1 | Gt0-1 | Gt0-1 | Gt0-1 | Gt0-1 |
| Steam test: paint detachment in mm | 0 | 0 | n.d. | 0 | 0.6 | 0 | 0.2 | 0 |

| Example/comparative example | CE 41 | E 42 | CE 43 | E 44 | E 45 | E 46 | E 47 | E 48 |
|---|---|---|---|---|---|---|---|---|
| Silane composition | — | 24 | 25 | 26 | 27 | 28 | 29 | 30 |
| Phosphonate comp./alternative compounds | A | A | Ti/ZrF$_6$ | A | A | A | A | A |
| Coating weight mg/m$^2$ for Ti | — | 13 | 40 | 0 | 0 | 0 | 30 | 30 |
| Coating weight mg/m$^2$ for Zr | — | 13 | 23 | 15 | 13 | 0 | 21 | 21 |

TABLE C-continued

Coatings and test results on coated specimens in the form of
spokes cut from wheels made from the aluminium alloy AlSi7.

| | | | | | | | | |
|---|---|---|---|---|---|---|---|---|
| Appearance without paint | very good | matt, poor | very matt, very poor | very good | very good | very good | good | good |
| Gloss without paint | very good | matt, poor | very matt, very poor | very good | very good | very good | small runs | small runs |
| Transparency with paint | very good | matt | n.d. | very good | very good | very good | good | good |
| Corrosion tests: | | | | | | | | |
| CASS test: scratch | 1.4 | 1.3 | n.d. | 1.4 | 1.4 | 2.5 | n.d. | n.d. |
| Filiform test as per Daimler MU/LF | 5.8/9.0 | 1.1/4.5 | n.d. | 0.9/5.0 | 1.3/7.0 | 1.6/7.0 | n.d. | n.d. |
| Filiform test as per GM | 4.6 | 3.0 | n.d. | 3.0 | 2.8 | n.d. | n.d. | n.d. |
| Paint adhesion tests: | | | | | | | | |
| Cross-hatch adhesion, dry | Gt0 | Gt0 | n.d. | Gt0 | Gt0 | Gt0 | n.d. | n.d. |
| Cross-hatch adhesion after 10 d storage whilst wet + 1 h RT | Gt0-1 | Gt0-1 | n.d. | Gt0-1 | Gt0-1 | Gt1 | n.d. | n.d. |
| Cross-hatch adhesion after 240 h CASS + 1 h RT | Gt0-1 | Gt0-1 | n.d. | Gt0-1 | Gt0-1 | Gt5 | n.d. | n.d. |
| Steam test: paint detachment in mm | 0 | 0 | n.d. | 0 | 0 | 0 | n.d. | n.d. |

| Example/comparative example | E 49 | E 50 | E 51 | E 52 | E 53 | E 54 | E 55 | E 56 |
|---|---|---|---|---|---|---|---|---|
| Silane composition | 31 | 32 | 33 | 34 | 35 | 36 | 19 | 19 |
| Phosphonate composition | A | A | A | A | A | A | C | D |
| Coating weight mg/m$^2$ for Ti | 33 | 30 | 30 | 31 | 30 | 30 | 30 | 30 |
| Coating weight mg/m$^2$ for Zr | 21 | 17 | 22 | 21 | 17 | 18 | 21 | 22 |
| Appearance without paint | good | good | good | good | good | good | good | good |
| Gloss without paint | small runs | matt, poor | small runs | good | small runs | matt, poor | matt, poor | matt, poor |
| Transparency with paint | good | matt | good | good | matt | matt | matt | matt |
| Corrosion tests: | | | | | | | | |
| CASS test: scratch | n.d. | n.d. | n.d. | n.d. | n.d. | n.d. | n.d. | n.d. |
| Filiform test as per Daimler MU/LF | n.d. | n.d. | n.d. | n.d. | n.d. | n.d. | n.d. | n.d. |
| Filiform test as per GM | n.d. | n.d. | n.d. | n.d. | n.d. | n.d. | n.d. | n.d. |
| Paint adhesion tests: | | | | | | | | |
| Cross-hatch adhesion, dry | n.d. | n.d. | n.d. | n.d. | n.d. | n.d. | n.d. | n.d. |
| Cross-hatch adhesion after 10 d storage whilst wet + 1 h RT | n.d. | n.d. | n.d. | n.d. | n.d. | n.d. | n.d. | n.d. |
| Cross-hatch adhesion after 240 h CASS + 1 h RT | n.d. | n.d. | n.d. | n.d. | n.d. | n.d. | n.d. | n.d. |
| Steam test: paint detachment in mm | n.d. | n.d. | n.d. | n.d. | n.d. | n.d. | n.d. | n.d. |

| Example/comparative example | E 57 | E 58 | E 59 | E 60 | E 61 | E 62 | E 63 | E 64 |
|---|---|---|---|---|---|---|---|---|
| Silane composition | 19 | 19 | 19 | 19 | 19 | 19 | 19 | 19 |
| Phosphonate composition | E | F | G | H | J | K | L | M |
| Coating weight mg/m$^2$ for Ti | 31 | 30 | 32 | 29 | 30 | 30 | 30 | 31 |
| Coating weight mg/m$^2$ for Zr | 21 | 20 | 21 | 21 | 22 | 19 | 21 | 22 |
| Appearance without paint | good | good | good | good | good | good | good | good |
| Gloss without paint | small runs | matt, poor | good | small runs | good | small runs | matt, poor | small runs |
| Transparency with paint | good | good | good | matt | good | good | matt | good |
| Corrosion tests: | | | | | | | | |
| CASS test: scratch | n.d. | n.d. | n.d. | n.d. | n.d. | n.d. | n.d. | n.d. |
| Filiform test as per Daimler MU/LF | n.d. | n.d. | n.d. | n.d. | n.d. | n.d. | n.d. | n.d. |
| Filiform test as per GM | n.d. | n.d. | n.d. | n.d. | n.d. | n.d. | n.d. | n.d. |
| Paint adhesion tests: | | | | | | | | |
| Cross-hatch adhesion, dry | n.d. | n.d. | n.d. | n.d. | n.d. | n.d. | n.d. | n.d. |
| Cross-hatch adhesion after 10 d storage whilst wet + 1 h RT | n.d. | n.d. | n.d. | n.d. | n.d. | n.d. | n.d. | n.d. |
| Cross-hatch adhesion after 240 h CASS + 1 h RT | n.d. | n.d. | n.d. | n.d. | n.d. | n.d. | n.d. | n.d. |
| Steam test: paint detachment in mm | n.d. | n.d. | n.d. | n.d. | n.d. | n.d. | n.d. | n.d. |

| Example/comparative example | E 65 | E 66 | E 67 |
|---|---|---|---|
| Silane composition | 19 | 19 | 19 |
| Phosphorate composition | N | O | P. |
| Coating weight mg/m$^2$ for Ti | 30 | 31 | 31 |
| Coating weight mg/m$^2$ for Zr | 20 | 21 | 22 |
| Appearance without paint | good | good | matt |
| Gloss without paint | good | small runs | matt, poor |
| Transparency with paint | good | matt | matt |

TABLE C-continued

Coatings and test results on coated specimens in the form of
spokes cut from wheels made from the aluminium alloy AlSi7.

| Corrosion tests: | | | |
|---|---|---|---|
| CASS test: scratch | n.d. | n.d. | n.d. |
| Filiform test as per Daimler MU/LF | n.d. | n.d. | n.d. |
| Filiform test as per GM | n.d. | n.d. | n.d. |
| Paint adhesion tests: | | | |
| Cross-hatch adhesion, dry | n.d. | n.d. | n.d. |
| Cross-hatch adhesion after 10 d storage whilst wet + 1 h RT | n.d. | n.d. | n.d. |
| Cross-hatch adhesion after 240 h CASS + 1 h RT | n.d. | n.d. | n.d. |
| Steam test: paint detachment in mm | n.d. | n.d. | n.d. |

Si contents in the coating derive from silane and the silicon content (7%) of the specimen and for that reason were not determined. Except in the case of CE22, the freshly applied silane coating was always rinsed with water.

The coating weight for the metal content of titanium or zirconium in the coating was determined by X-ray fluorescence analysis (Philips PW 2400 X-ray fluorescence spectrometer).

The appearance of the treated spokes was assessed both after drying and after painting with the clear powder coating. The result without and with paint was almost always the same, as in many cases small runs are no longer visible after painting. In the visual quality assessment after painting and staving of the powder coating a location of a small run is assessed as good but not very good. In the appearance of the coated substrates, small runs, spots and a cloudy appearance should be rated as poor, runs as very poor. In terms of the transparency of these coated substrates, a matt appearance should also be assessed as poor.

The spokes treated and painted according to the invention should be colourless and highly transparent. If the appearance is classed as good, the gloss is almost the same as before the treatment according to the invention, and if it is classed as very good it is the same as before the treatment according to the invention. If the appearance of the coating is matt or even very matt, then it must be rated as poor or even very poor.

Many aluminium wheel manufacturers now expect a result of in most cases <2 mm, sometimes even <1 mm, as the test result for the CASS test on a scratch.

TABLE D

Current requirements for high-quality aluminium-based
wheels in terms of corrosion resistance and paint adhesion:

| Corrosion tests: | |
|---|---|
| CASS test: scratch | ≤2 (≤1) mm |
| Filiform test as per Daimler MU/LF | ≤2 mm/≤4 mm |
| Filiform test as per GM | ≤4 mm |
| Paint adhesion tests: | |
| Crosshatch adhesion, dry | Gt0-Gt1 |
| Cross-hatch adhesion after 10 d storage whilst wet +1 h RT | Gt0-Gt1 |
| Cross-hatch adhesion after 240 h CASS +1 h RT | Gt0-Gt1 |
| Steam test | No paint detachment* |

*0 mm paint detachment required

Samples which do not meet these requirements must therefore be classed as less good, as poor or even as very poor. If, however, the results are well below these required values, this should be regarded as a competitive advantage for the customer and scored very positively. This is particularly true in the case of the results of the Daimler filiform test. As yet there is no definitive name nor are there any definitive guidelines for this test. For these results it should be emphasised that in the sector for the manufacture of aluminium-based wheels they must hitherto clearly be classed uniquely as good.

The steam test refers to the treatment of a scratch on the painted surface with a steam jet machine or high-pressure cleaner.

In Example 21 in the first coating stage a silane-containing solution was applied, rinsed with demineralised water, then a phosphonate-containing coating was applied and again rinsed with demineralised water before the parts were dried (standard procedure).

In comparative example CE 28 the chromate coating is itself yellowish, indicating excessively high chromium loadings. Despite the excessively high chromium loading (=excessively high chromate contents), the quality of the filiform test as per Daimler and as per the GM guidelines is markedly poorer than in many examples according to the invention. Conventionally only chromium loadings of up to 12 mg/m$^2$ Cr are permissible, yet in this case in comparative example CE 28 the values are as high as 16 mg/m$^2$. Despite the excessive chromate contents, the quality of the chromating layer is poorer than that of the conversion coatings according to the invention.

In example CE 29 a silane-free solution containing titanium fluoride/zirconium fluoride was applied in the first coating stage.

The tests showed that a coating system produced by application of a silane-containing solution in the first coating stage, rinsing with demineralised water and then application of a phosphonate-containing solution, rinsing with demineralised water and then drying of the coated parts, resulted in the best corrosion and paint adhesion properties, with very good visual properties too.

Coating of the silane coating whilst wet and subsequent treatment by rinsing with water (wet-in-wet process) as in Example E 23 is far more advantageous than drying of the silane coating (no-rinse process) as in Example E 22.

The invention claimed is:

1. A process for coating a metallic surface comprising the steps of:
    contacting the metallic surface with an aqueous composition containing at least one silicon compound selected from the group consisting of a silane, a silanol, a siloxane and a polysiloxane to form a silane coating on the metallic surface and then contacting the metallic surface having the silane coating formed thereon with an aqueous composition containing a phosphone compound to form a phosphonate coating thereon, wherein at least 80 mole % of all phosphone compounds of the aqueous composition containing the phosphone compound are selected from compounds of the type XYZ, wherein Y is mutually independently an unbranched alkyl group having 8 to 16 C atoms or an alkyl group having 8 to 16 C atoms, of which as a statistical mean up to 20% of the C atoms of the alkyl chains exhibit a functional group, wherein X is an OH, $NH_2$, NHR', $CH=CH_2$, CONHOH, COOR', acrylic acid amide, epoxy, $CH_2=CR''-COO$, COOH, $HSO_4$, $(OH)_2PO$, $(OH)_2PO_2$, $(OH)(OR')PO$, $(OH)(OR')PO_2$ or $Si(OH)_3$ group, wherein Z is an $(OH)_2PO$, $(OH)_2PO_2$, $(OH)(OR')PO$ or $(OH)(OR')PO$, group, wherein R' is an alkyl group having 1 to 4 C atoms, wherein R'' is an H atom or an alkyl group having 1 to 4 C atoms, wherein groups X and Z are each bound to group Y in its terminal position, wherein the silane coating and the phosphonate coating are formed in succession before the metallic surfaces are coated with a coat of paint or with a coat of adhesive, and wherein the metallic surface comprises an aluminum alloy.

2. A process according to claim 1, wherein said at least one silicon compound is present in the aqueous composition in the range from 0.003 to 10 g/l.

3. A process according to claim 1, wherein the silicon compound is selected from the group consisting of a monosilane, a bis-silyl silane or a tris-silyl silane.

4. A process according to claim 1, wherein silicon compound is selected from the group consisting of an alkoxysilane, an aminosilane, an epoxysilane and a vinylsilane.

5. A process according to claim 1, wherein the silicon compound is selected from the group consisting of a monoaminosilane, a diaminosilane, a dialkoxysilane and a trialkoxysilane.

6. A process according to claim 1, wherein the aqueous composition containing the silicon compound further comprises a compound containing a member selected from the group consisting of titanium, hafnium and zirconium.

7. A process according to claim 6, wherein the aqueous composition containing the silicon compound further comprises a cation selected from cations of metals of the $1^{st}$, $2^{nd}$, $3^{rd}$, $5^{th}$, $6^{th}$, $7^{th}$, and $8^{th}$ subgroup including lanthanides and the $2^{nd}$ main group of the periodic table.

8. A process according to claim 6, wherein the aqueous composition containing the silicon compound further comprises a member selected from the group consisting of selected silicon-free compound having an amino, urea, imido or imino group, an anion of nitrite, a compound having a nitro group, a compound based on peroxide a phosphorus-containing compound, an anion of a phosphate, an anion of a phosphonate and water.

9. A process according to claim 6, wherein the aqueous composition containing the silicon compound further comprises an organic solvent.

10. A process according to claim 1, wherein the aqueous composition containing the silicon compound further comprises a member selected from the group consisting of an organic oligomer, an organic polymer, an amine, a base, a complexing agent, a surfactant, an inorganic particle, an inorganic acid and an organic acid, or a derivative thereof.

11. A process according to claim 1, wherein the aqueous composition containing the silicon compound has a pH in the range from 3 to 11.

12. A process according to claim 1, wherein the aqueous composition containing the silicon compound has a temperature in the range from 5 to 80° C. when contact is made.

13. A process according to claim 1, wherein the aqueous composition containing the silicon compound is applied by spraying or dipping.

14. A process according to claim 1, wherein the aqueous composition containing the phosphone compound contains a total content of phosphone compound in the range from 0.001 to 10 g/l.

15. A process according to claim 1, wherein the phosphone compound is based on phosphonic acid, diphosphonic acid, esters thereof or salts thereof.

16. A process according to claim 1, wherein the aqueous composition containing the phosphone compound further comprises a member selected from the group consisting of a biocide, a demulsifier, a fragrance, an emulsifier, a defoamer, a solubiliser, a surfactant, an agent for adjusting the pH, an agent for adjusting the electrical conductivity, an organic oligomer, an organic polymer, an amine and a complexing agent.

17. A process according to claim 1, wherein the aqueous composition containing the phosphone compound has a pH in the range from 1.5 to 9.0.

18. A process according to claim 1, wherein the aqueous composition containing the phosphone compound has a temperature in the range from 5 to 80° C. when contact is made.

19. A process according to claim 1, wherein the aqueous composition containing phosphone compound is applied by at least one method selected from the group consisting of dipping, spattering, spraying and misting.

20. A process according to claim 1, wherein the metallic surfaces are cleaned, degreased or pickled before being brought into contact with an aqueous composition containing the silicon compound.

21. A process according to claim 1, wherein the metallic surfaces are rinsed with water before or after being brought into contact with the aqueous composition containing the silicon compound or before or after being brought into contact with the aqueous composition containing the phosphone compound.

22. A process according to claim 1, wherein the metallic surface is not completely dried after said contacting but is contacted with the aqueous coating containing the phosphonate.

23. A process according to claim 1, wherein the metallic surface is dried after contact with the aqueous composition containing the silicon compound before being coated with the aqueous composition containing the phosphonate.

24. A process according to claim 1, wherein after contacting with the aqueous composition containing the phosphonate is covered with a coat of a primer, a paint or an adhesive.

25. A process according to claim 1, wherein metallic surface comprises a member selected from the group consisting of aluminum, magnesium, iron, steel, titanium, zinc and tin, or alloy thereof are treated.

26. A metallic product coated by the process according to claim 1.

27. A process for coating a metallic surface, in a multi-stage process, comprising the steps of:
first contacting the metallic surface of a wheel with an aqueous composition having a total content of at least one member selected from the group consisting of silane, silanol, siloxane and polysiloxane in the range from 0.003 to 10 g/l to form a silane coating on the metallic surface; and then contacting the metallic surface having the silane coating formed thereon with an aqueous composition predominantly having a total content of at least one phosphone compound in the range from 0.001 to 10 g/l to form a phosphonate coating thereon, wherein at least 80 mole % of all phosphone compounds of the aqueous composition containing at least one phosphone compound are selected from compounds of the formula XYZ;

wherein the metallic surface comprises aluminum;

wherein Y is mutually independently an unbranched alkyl group having 8 to 16 C atoms or an alkyl group having 8 to 16 C atoms, of which as a statistical mean up to 20% of the C atoms of the alkyl chains exhibit a functional group;

wherein X is OH, $NH_2$, NHR', $CH=CH_2$, CONHOH, COOR', acrylic acid amide, epoxy, $CH_2=CR''-COO$, COOH, $HSO_2$, (OH)PO, $(OH)_2PO_2$, (OH)(OR')PO, (OH)(OR')PO, or $Si(OH)_3$;

wherein Z is $(OH)_2PO$, $(OH)_2PO_2$, (OH)(OR')PO or (OH)(OR')$PO_2$;

wherein R' is an alkyl group having 1 to 4 carbon atoms;

wherein R'' is an H atom or an alkyl group having 1 to 4 carbon atoms;

wherein groups X and Z are respectively bound to the terminal positions of group Y; and wherein the silane coating and the phosphonate coating are formed in succession before the metallic surface is coated with a coat of paint or a coat of adhesive.

* * * * *

UNITED STATES PATENT AND TRADEMARK OFFICE
CERTIFICATE OF CORRECTION

PATENT NO. : 9,511,392 B2  
APPLICATION NO. : 13/203750  
DATED : December 6, 2016  
INVENTOR(S) : Lars Sebralla and Manfred Walter Page 1 of 1

It is certified that error appears in the above-identified patent and that said Letters Patent is hereby corrected as shown below:

In the Claims

Claim 1, at Column 25 Line 16-17, reads "or (OH)(OR')PO, group" and should read -- or (OH)(OR')PO$_2$ group --.

Claim 27, at Column 28 Line 7 reads "(OH)(OR')PO" and should read -- (OH)(OR')PO$_2$ --.

Signed and Sealed this
Fourth Day of April, 2017

Michelle K. Lee
*Director of the United States Patent and Trademark Office*